M. P. OTTO.
CLUTCH MECHANISM FOR TRANSMITTING MOTION.
APPLICATION FILED NOV. 18, 1913.

1,166,075.

Patented Dec. 28, 1915.
3 SHEETS—SHEET 1.

Inventor:
Marius Paul Otto
By
Atty

M. P. OTTO.
CLUTCH MECHANISM FOR TRANSMITTING MOTION.
APPLICATION FILED NOV. 18, 1913.

1,166,075.

Patented Dec. 28, 1915.

UNITED STATES PATENT OFFICE.

MARIUS PAUL OTTO, OF PARIS, FRANCE.

CLUTCH MECHANISM FOR TRANSMITTING MOTION.

1,166,075. Specification of Letters Patent. Patented Dec. 28, 1915.

Application filed November 18, 1913. Serial No. 801,594.

*To all whom it may concern:*

Be it known that I, MARIUS PAUL OTTO, a citizen of the Republic of France, residing at No. 44 Avenue du Bois de Boulogne, Paris, France, have invented certain new and useful Improvements in Clutch Mechanism for Transmitting Motion, of which the following is a specification.

This invention relates to clutch mechanism for transmitting motion, and has for its object a mechanism operated electrically from a distance which allows of transmitting at any time from a shaft, which rotates continuously in a determined direction, the necessary energy for operating a device in one or the other direction.

The invention consists in a special gearing constituted by an endless screw or other rotary device which is connected by means of a universal joint to a continuously rotating shaft, and is capable, by means of an electrically controlled oscillating device of being brought into engagement with one or the other of two mechanical transmissions for the purpose of driving the device to be actuated in one or the other direction.

The invention is more particularly applicable to steering from a distance marine or an aerial torpedo by means of electric waves. When applied to such a purpose the continuously rotating shaft is the driving shaft of the screw propeller of the torpedo, and the clutch device connected to the said shaft by a universal joint, is, by the action of an oscillating device electrically actuated from a distance, brought at will into engagement with one or the other of two motion-transmitting devices producing movement to the left or to the right of the rudder.

A practical construction of the invention in its application to a marine torpedo is illustrated by way of example in the accompanying drawings:—

Figure 1:
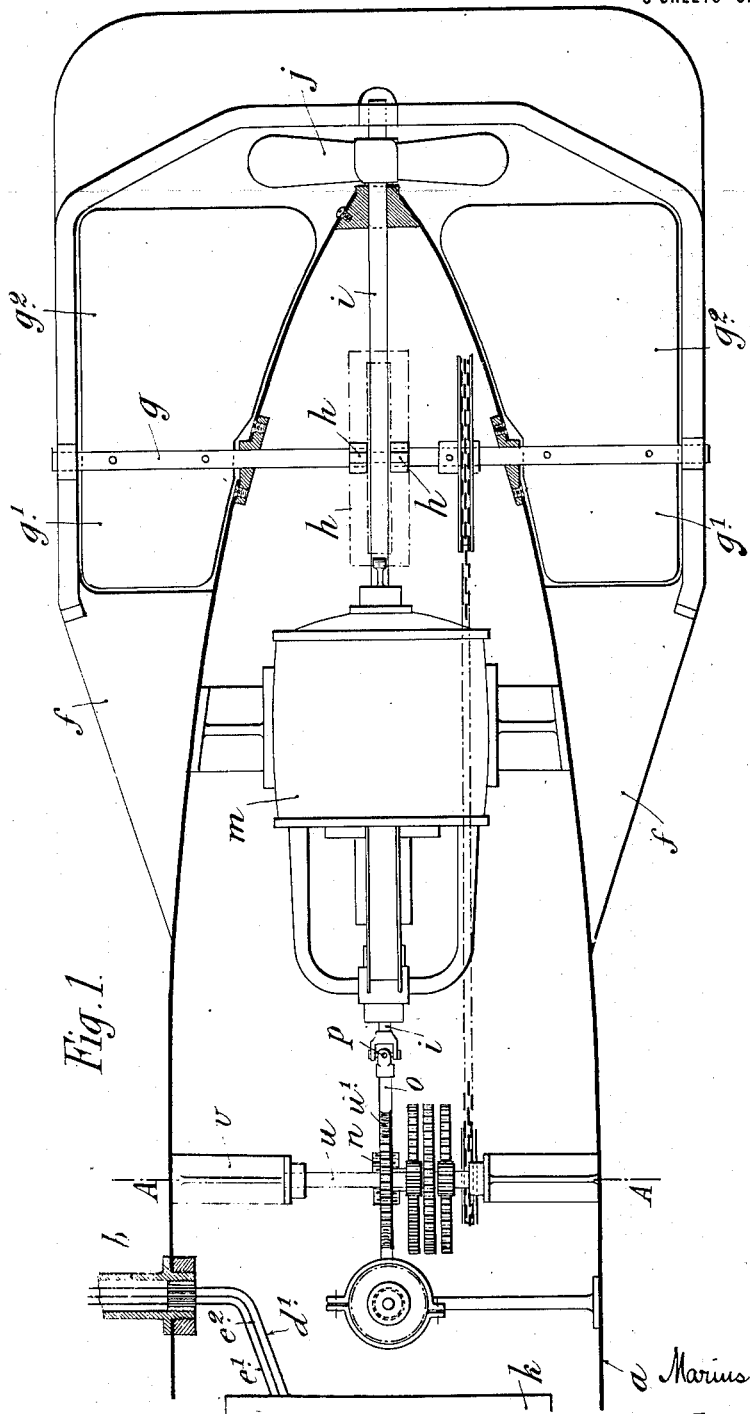
Figure 2:
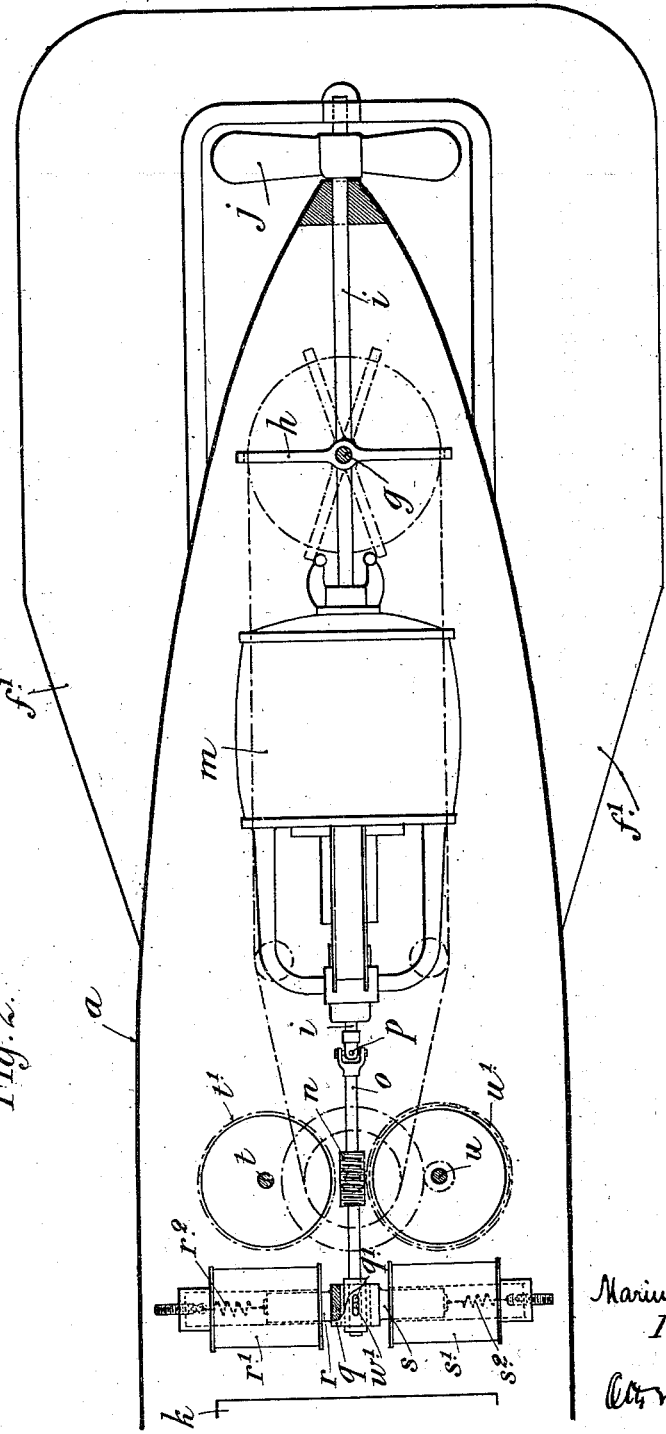
Figure 3:
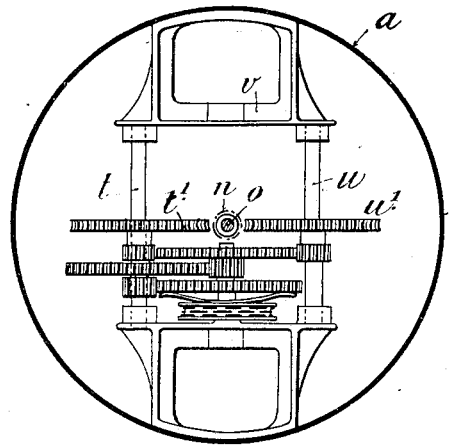

Figure 1 is a partial longitudinal section of a torpedo provided with the mechanism forming the subject of this invention. Fig. 2 is a corresponding sectional plan, and Fig. 3 is a cross section on the line A—A of Fig. 1.

$a$ is the shell of the torpedo, within which is arranged the motor $m$ of electric or other type, which drives the shaft $i$ that carries the screw propeller $j$ continuously and in a determined direction. The device to be moved at will in one or the other direction is the rudder $g^1$ $g^2$ mounted on an axle or shaft $g$ which revolves in bearings in the shell $a$, and allows of the free passage of the shaft $i$ by means of a crank bend or frame $h$.

In the example shown the rudder $g'$ $g^2$ is arranged within a vertical fin-like structure $f$ $f$ and in a horizontal fin-like structure $f'$ $f'$.

The motor is assumed to be an electric motor.

$k$ is an electric wave-receiving apparatus fed by a conductor $d'$ arranged in an upright $b$ and connected to an antenna that is suitably mounted on the shell $a$.

According to this invention motion can at any moment be derived from the shaft $i$ for moving the rudder $g'$ $g^2$ to the right or to the left by means of the following clutch or motion transmitting mechanism.

A rotary gearing device such as a screw $n$ is fixed to a shaft $o$ connected on the one hand by a Cardan joint $p$ to the shaft $i$ of the motor $n$, and capable on the other hand, by the action of a device $q$ which is adjusted to oscillate, in one or the other direction under the action of the circuit established by the electric waves, of being brought into engagement with one or the other of the two mechanical transmission mechanisms for producing motion of the shaft $g$ and consequently of the rudder $g'$ $g^2$ in one or the other direction.

In the example shown, the device which is caused to oscillate in one or the other direction by the circuits established by the influence of the electric waves, consists of a double core $r$ $s$, each of the elements $r$ $s$ of this core corresponding to a bobbin $r'$ $s'$ respectively of an electro-magnet.

The cores $r$ $s$ are arranged one in line with the other so as to project from the device $q$ which is constructed in the form of a ring. The shaft $o$ carrying the screw $n$ revolves in a bearing $w$ provided inside this ring. The shaft $o$ is thus enabled to revolve in a continuous manner and to be driven by means of a Cardan joint $p$, while participating in the longitudinal movements imparted to the ring $q$. The bearing $w$ is guided by means of a pin $w'$ in a slot $q'$ of the ring $q$.

According as the circuit by means of the receiving apparatus $k$ is closed through the electro-magnet $r'$ and is opened through $s'$ or vice versa, the core $r$ or the core $s$ respectively is attracted by the corresponding bobbin so that the oscillating device $q$ is moved to the left or to the right. This movement brings the worm $n$ into engagement either with the helical wheel $t'$ mounted on the shaft $t$ or with the helical wheel $u'$ mounted on the shaft $u$. The shafts $t$ and $u$ revolve in bearings in a frame $v$ provided inside the shell $a$. Springs $r^2$ and $s^2$ respectively cause the oscillating device $q$ to return to its mid-position in which the screw $n$ is completely disengaged.

The transmission of motion from the shaft $t$ or from the shaft $u$ to the shaft $g$ carrying the rudder is effected by any suitable transmission gearing, preferably speed reducing, and is so designed for example as to cause the rudder to describe a maximum angle of 80 degrees in a period of approximately one minute.

It is to be understood that the oscillatory movements of the device $q$ instead of being effected by the electro-magnet cores $r$ $s$, may be produced by any other suitable means. Similarly the alternative gearing elements $n$ $t'$, $n$ $u'$ may be of any other kind besides a worm or screw and helical wheels.

Having now described my invention what I claim as new and desire to secure by Letters Patent is:—

1. In clutch mechanism for the purpose specified, the combination of a motor having a shaft extending beyond both ends thereof, a propeller carried at the forward end of said shaft and a universal joint carried at the opposite end of said shaft, a second shaft traversing the forward portion of said first mentioned shaft at right angles thereto, rudder sections carried near opposite ends of said second shaft, a stub shaft having one end secured to said universal joint, an oscillating barrel in which the opposite end of said stub shaft loosely engages, means for moving said barrel in opposite directions to carry said stub shaft in corresponding directions, a worm carried by said stub shaft intermediate its ends, oppositely disposed gears with which said worm is adapted to mesh, and a flexible connection between said gears and said second shaft whereby said rudder sections are moved in the desired direction.

2. In clutch mechanism for the purpose specified, the combination of a motor having a shaft extending beyond both ends thereof, a propeller carried at the forward end of said shaft and a universal joint carried at the rear end of said shaft, a second shaft traversing the forward portion of said first mentioned shaft at right angles thereto, rudder sections carried near opposite ends of said second shaft, a stub shaft having one end secured to said universal joint, an oscillating barrel in which the opposite end of said stub shaft loosely engages, electrically controlled means at opposite ends of said barrel for moving the latter in opposite directions, means for normally retaining said barrel in a middle position between said electrically controlled means, a worm carried by said stub shaft intermediate its ends, oppositely disposed gears with which said worm is adapted to mesh, and a flexible connection between said gears and said second shaft whereby said rudder sections are moved in the desired direction.

In testimony whereof I have affixed my signature in presence of two witnesses.

MARIUS PAUL OTTO.

Witnesses:
Louis Fanteat,
Hanson C. Coxe.